US012584449B2

(12) United States Patent
Iwasaki

(10) Patent No.: US 12,584,449 B2
(45) Date of Patent: Mar. 24, 2026

(54) CONTROLLER FOR INTERNAL COMBUSTION ENGINE

(71) Applicant: TOYOTA JIDOSHA KABUSHIKI KAISHA, Toyota (JP)

(72) Inventor: Ryota Iwasaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/000,670

(22) Filed: Dec. 23, 2024

(65) Prior Publication Data

US 2025/0264065 A1 Aug. 21, 2025

(30) Foreign Application Priority Data

Feb. 21, 2024 (JP) ................................ 2024-024496

(51) Int. Cl.
*F02D 19/02* (2006.01)
*F02D 41/30* (2006.01)

(52) U.S. Cl.
CPC ......... *F02D 19/024* (2013.01); *F02D 19/025* (2013.01); *F02D 41/3005* (2013.01)

(58) Field of Classification Search
CPC ... F02D 19/024; F02D 19/025; F02D 41/3005
See application file for complete search history.

(56) References Cited

U.S. PATENT DOCUMENTS 11,882,250 B2 * 1/2024 Ishihara ............. H04N 1/00403
2006/0180128 A1 * 8/2006 Saito .................. F02D 41/3836
123/525
2020/0101835 A1 * 4/2020 Yasuzaka ......... B60K 15/03006

FOREIGN PATENT DOCUMENTS

JP 2006250141 A 9/2006
KR 2010003002 A * 6/2008 ............. F02D 41/22

* cited by examiner

*Primary Examiner* — Kevin A Lathers

(57) ABSTRACT

A leakage determination process determines whether there is fuel leakage from a fuel supply system on condition that a start switch of an internal combustion engine has been turned on. A start estimation process estimates whether there is a possibility of a start operation before the start switch is turned on. Processing circuitry does not execute the fuel injection through the fuel injection process if the leakage determination process has not been completed in a case in which the start switch has already been turned on. The processing circuitry starts the leakage determination process when the start estimation process estimates that there is the possibility of a start operation even if the start switch is not turned on.

5 Claims, 3 Drawing Sheets

CONTROLLER FOR INTERNAL COMBUSTION ENGINE

CROSS-REFERENCE TO RELATED APPLICATIONS

This application is based upon and claims the benefit of priority from Japanese Patent Application No. 2024-024496, filed on Feb. 21, 2024, the entire contents of which are incorporated herein by reference.

BACKGROUND

1. Field

The present disclosure relates to a controller for an internal combustion engine.

2. Description of Related Art

Japanese Laid-Open Patent Publication No. 2006-250141 discloses a controller for an internal combustion engine. This controller detects whether there is fuel leakage.

There is potential to shorten the time from when the start switch is turned on to when fuel injection is started.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine is mounted on a vehicle. The controller includes processing circuitry that is configured to execute: a fuel injection process of executing fuel injection by a fuel injection valve of the internal combustion engine on condition that a start switch of the internal combustion engine has been turned on; a leakage determination process of determining whether there is fuel leakage from a fuel supply system of the internal combustion engine on condition that the start switch has been turned on; and a start estimation process of estimating whether there is a possibility of a start operation before the start switch is turned on, the possibility of a start operation refers to likelihood that the start switch will be turned on. The processing circuitry is configured not to execute the fuel injection through the fuel injection process if the leakage determination process has not been completed in a case in which the start switch has already been turned on. The processing circuitry is configured to start the leakage determination process when the start estimation process estimates that there is the possibility of a start operation even if the start switch is not turned on.

With the above-described configuration, the controller starts the leakage determination process also when it has been estimated that there is a possibility of a start operation. In this case, for example, the leakage determination process is completed earlier than in a case in which the leakage determination process is started when the start switch has been turned on. Accordingly, it is possible to shorten the time from when the start switch is turned on to when fuel injection is started.

For example, the controller may initiate the determination of whether fuel leakage is present in the fuel supply system in response to the operation of turning on the start switch. Hypothetically, this leakage determination method could be applied to an internal combustion engine that executes fuel injection through the fuel injection valves only on the condition that no fuel leakage is present. In such a case, the time from the operation of turning on the start switch to the commencement of fuel injection could become longer. The above-described configuration suppresses this potential issue.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for an internal combustion engine 10 according to an embodiment will now be described with reference to FIGS. 1 to 3.

Internal Combustion Engine and Controller

Figure 1:
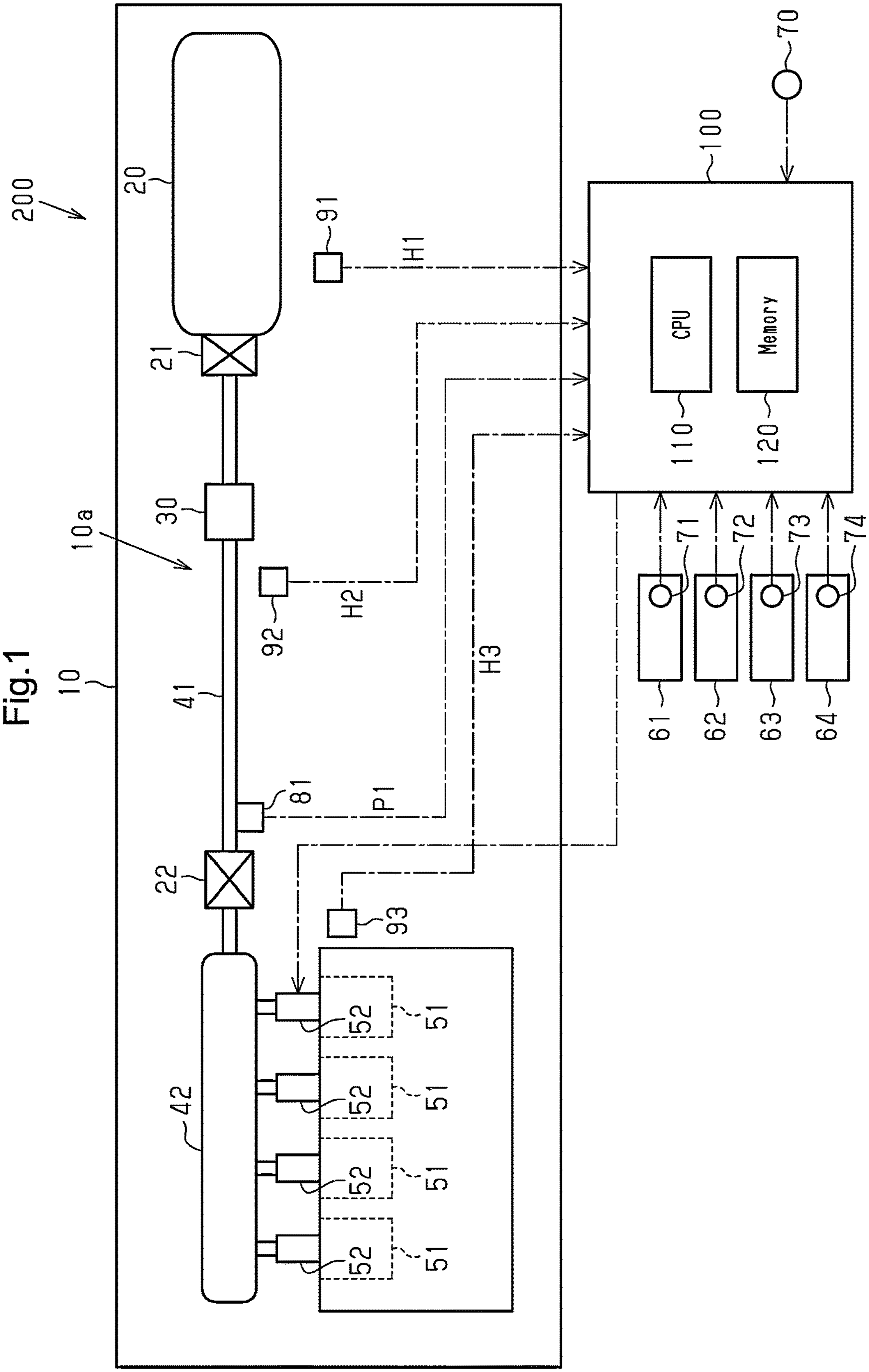
FIG. 1 is a schematic diagram showing an overall configuration of an internal combustion engine according to an embodiment.

The internal combustion engine 10 shown in FIG. 1 operates using hydrogen gas as fuel. The internal combustion engine 10 is mounted on a vehicle 200. Hereinafter, the hydrogen gas may be referred to as a fuel.

The internal combustion engine 10 includes a fuel supply system 10*a*. The fuel supply system 10*a* includes a tank 20, first and second shut-off valves 21 and 22, a pressure reducing valve 30, a fuel pipe 41, a delivery pipe 42, and multiple fuel injection valves 52.

The tank 20 stores the fuel in a compressed state. The fuel pipe 41 is a fuel passage through which fuel flows. The fuel pipe 41 connects the tank 20 to the delivery pipe 42. Each fuel injection valve 52 is connected to the delivery pipe 42.

The fuel stored in the tank 20 is supplied to each fuel injection valve 52 via the fuel pipe 41 and the delivery pipe 42. The fuel injection valves 52 inject fuel into the cylinders 51 of the internal combustion engine 10.

In the fuel pipe 41, the first shut-off valve 21, the pressure reducing valve 30, and the second shut-off valve 22 are arranged in this order along the direction of the fuel flowing from the tank 20 to the fuel injection valves 52.

The first shut-off valve 21 is disposed near the outlet of the tank 20. When the first shut-off valve 21 is opened, the fuel is supplied from the tank 20 to the fuel pipe 41. When the first shut-off valve 21 is closed, the supply of the fuel from the tank 20 to the fuel pipe 41 is stopped.

The pressure reducing valve 30 adjusts the pressure of the fuel supplied to the fuel injection valves 52 to a pressure corresponding to the operating state of the internal combustion engine 10.

The second shut-off valve 22 is disposed in the vicinity of the delivery pipe 42. When the second shut-off valve 22 is open, fuel is supplied from the fuel pipe 41 to the delivery pipe 42. When the second shut-off valve 22 is closed, the supply of fuel from the fuel pipe 41 to the delivery pipe 42 is stopped.

When the operation of the internal combustion engine 10 is stopped, both the first shut-off valve 21 and the second shut-off valve 22 are closed. On the other hand, when the internal combustion engine 10 is operating, the first shut-off valve 21 and the second shut-off valve 22 are both open.

The control unit 100 of the internal combustion engine 10 includes a CPU 110 and a memory 120 including a ROM, a RAM, and the like. The control unit 100 executes various processes when the CPU 110 executes a program stored in the memory 120. The control unit 100 corresponds to a control circuit. The CPU 110 corresponds to processing circuitry. The memory 120 corresponds to a non-transitory storage medium. Some or all of the constituent elements of the control unit 100 may be realized by hardware (circuit unit; including circuitry) such as a large scale integration (LSI), an application specific integrated circuit (ASIC), a field-programmable gate array (FPGA), or a graphics processing unit (GPU), or may be realized by cooperation of software and hardware. The control unit 100 constitutes a controller of the internal combustion engine 10.

The control unit 100, the pressure sensor 81, the first to third hydrogen sensors 91 to 93, the start switch 70, the door open/close switch 71, the lock sensor 72, the seating sensor 73, and the buckle sensor 74 are examples of multiple components constituting the control system of the internal combustion engine 10.

Sensors

A pressure sensor 81 is provided in a portion of the fuel pipe 41 between the pressure reducing valve 30 and the second shut-off valve 22. The pressure sensor 81 outputs a signal corresponding to the fuel pressure P1 in the fuel supply system 10*a*.

A first hydrogen sensor 91 is provided in the vicinity of the tank 20. The first hydrogen sensor 91 outputs a signal corresponding to a first hydrogen concentration H1. The first hydrogen concentration H1 is a hydrogen concentration in the vicinity of the tank 20.

A second hydrogen sensor 92 is provided in the vicinity of a portion of the fuel pipe 41 between the pressure reducing valve 30 and the second shut-off valve 22. The second hydrogen sensor 92 outputs a signal corresponding to the second hydrogen concentration H2. The second hydrogen concentration H2 is a hydrogen concentration in the vicinity of a portion of the fuel pipe 41 between the pressure reducing valve 30 and the second shut-off valve 22.

A third hydrogen sensor 93 is provided in the vicinity of the delivery pipe 42. The third hydrogen sensor 93 outputs a signal corresponding to a third hydrogen concentration H3. The third hydrogen concentration H3 is a hydrogen concentration in the vicinity of the delivery pipe 42.

The control unit 100 executes fuel injection into the cylinders 51 by controlling the fuel injection valves 52. The control unit 100 detects the fuel pressure P1 based on the signal outputted from the pressure sensor 81. The control unit 100 detects the respective hydrogen concentrations based on the output signals of the first to third hydrogen sensors 91 to 93.

The control unit 100 and the pressure sensor 81 are an example of a pressure detection device that detects the internal pressure of the fuel supply system 10*a*. The control unit 100 and the first to third hydrogen sensors 91 to 93 are an example of a concentration detector that detects the hydrogen concentration. The concentration detector is an example of a leakage detector that detects fuel leakage. The detection target of the leakage detector does not necessarily need to include the fuel leakage from the fuel injection valves 52 into the cylinders 51 among the fuel leakages.

The vehicle 200 includes a door open/close switch 71 that detects an open/close state of the passenger door 61. The vehicle 200 includes a lock sensor 72. The lock sensor 72 detects that the lock mechanism 62 for the passenger door 61 of the vehicle 200 is changed from the locked state to the unlocked state. The vehicle 200 includes a seating sensor 73. The seating sensor 73 detects whether an occupant is seated on the seat 63 of the vehicle 200. The vehicle 200 includes a buckle sensor 74. The buckle sensor 74 detects whether a tongue of a seat belt of the vehicle 200 is inserted into the buckle 64. The open/closed state of the passenger door 61 corresponds to the device state of the passenger door 61, which is a vehicle on-board device. For example, the open state of the passenger door 61 is the first state. The closed state of the passenger door 61 is the second state. The first state is different from the second state. For example, the locked state of the lock mechanism 62 is the first state. The unlocked state of the lock mechanism 62 is the second state.

Processing Executed by Control Unit

The control unit 100 executes a fuel injection process. In the fuel injection process, fuel injection by the fuel injection valves 52 is executed on condition that the start switch 70 of the internal combustion engine 10 has been turned on.

The control unit 100 executes the start estimation process before the start switch 70 is turned on. The start preparation period is a period from an opening operation of the passenger door 61 to an operation of turning on the start switch 70. For example, the start preparation period corresponds to a period from when the occupant enters the vehicle 200 by opening the passenger door 61 to when the occupant turns on the start switch 70. In the start estimation process, the possibility of a start operation is estimated during the start preparation period. The possibility of a start operation is a possibility that the start switch 70 will be turned on to start the internal combustion engine 10. The starting operability is also engine starting operability. The operation of opening the passenger door 61 may include an operation of unlocking the lock mechanism 62 of the passenger door 61. For example, the occupant unlocks the lock mechanism 62, then opens the passenger door 61, and gets into the vehicle 200.

The control unit 100 detects the following [1] to [4] based on the output signals of the lock sensor 72, the door open/close switch 71, the seating sensor 73, and the buckle sensor 74.

[1] The lock of the passenger door 61 by the lock mechanism 62 is unlocked;

[2] The passenger door 61 is opened.

[3] The seat 63 of the vehicle 200 is changed to a state of supporting an occupant.

[4] The seat belt of the vehicle 200 changes to a state of restraining the occupant.

The control unit 100 estimates that there is a possibility of a start operation when at least one of [1] to [4] has been detected during the start preparation period. The vehicle 200 does not necessarily need to be provided with the lock sensor 72. In this case, the control unit 100 may detect the unlocking of the passenger door 61 based on the fact that the control unit 100 outputs a signal for unlocking to the lock mechanism 62.

The control unit 100 performs a leakage determination process for determining whether there is fuel leakage from the fuel supply system 10*a*. That is, when starting the leakage determination process, the control unit 100 turns on the fuel cutoff flag for stopping the fuel injection and turns on the first to third hydrogen sensors 91 to 93. The control unit 100 determines whether there is fuel leakage by referring to the first to third concentrations H1 to H3 in the leakage determination process. To be specific, when all of the first to third concentrations H1 to H3 are equal to or less than a specified value HL, the control unit 100 determines that the fuel leakage does not occur. When at least one of the first to third concentrations H1 to H3 exceeds the specified value HL, the control unit 100 determines that fuel leakage has occurred.

Figure 2:
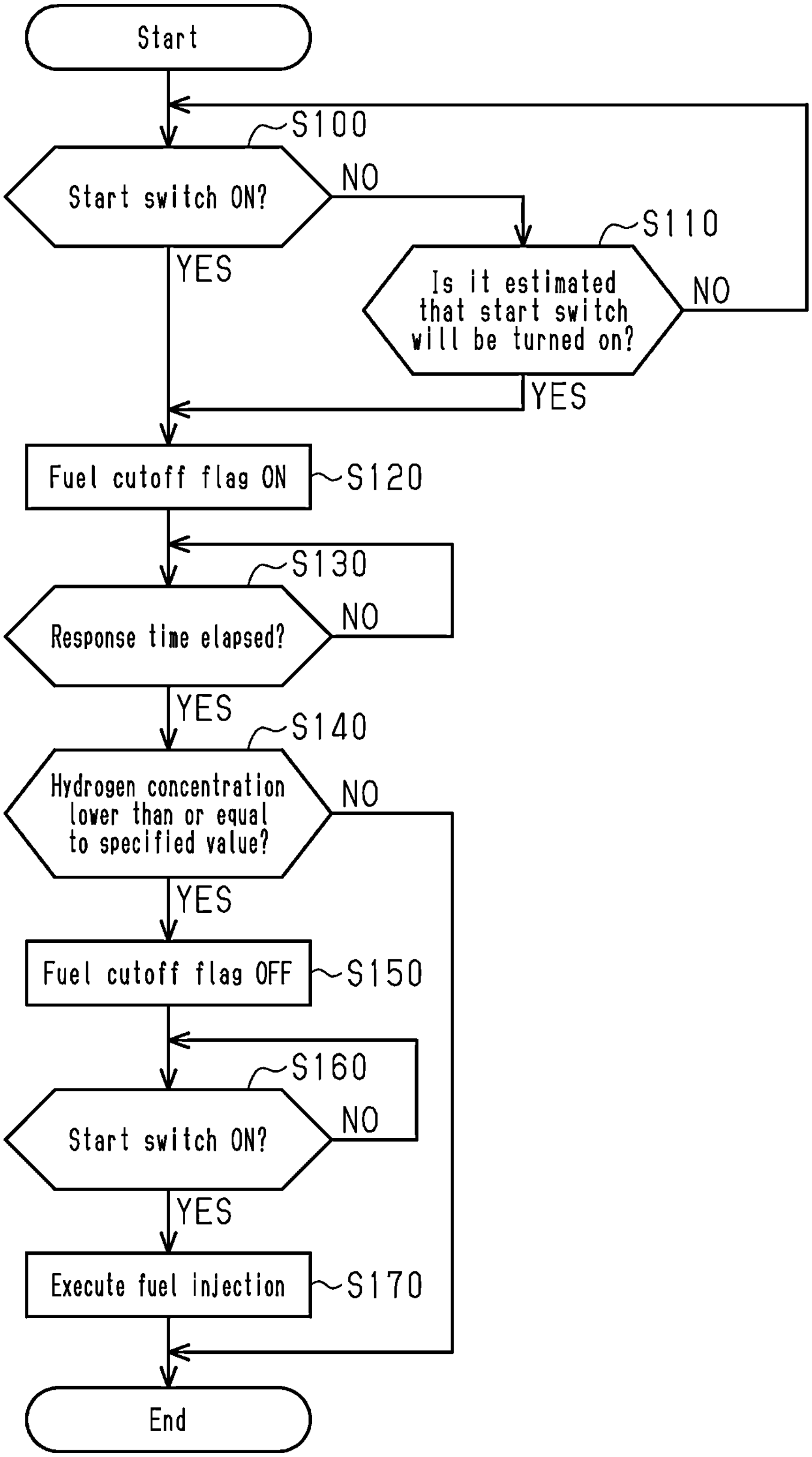
FIG. 2 is a flowchart showing a procedure of processes executed by the controller shown in FIG. 1.

With reference to FIG. 2, flows of a fuel injection process, a start estimation process, and a leakage determination process executed by the control unit 100 will be described.

As shown in FIG. 2, when the start switch 70 is turned on (S100: YES), the control unit 100 executes a leakage determination process (S120 to S150). When the start switch 70 has not been turned on (S100: NO), the control unit 100 executes a start estimation process (S110). Even when the start switch 70 has not been turned on (S100: NO), the control unit 100 starts the leakage determination process (S120 to S150) when the start estimation process has already estimated that there is a possibility of a start operation (S110: YES). The start operation possibility is a possibility that the start switch 70 will be turned on.

When the control unit 100 starts the leakage determination process, the control unit 100 turns on the fuel cutoff flag (S120). The control unit 100 measures an elapsed time from the start of the leakage determination process. The control unit 100 determines whether the elapsed time has reached a specified response time (step S130). If the elapsed time has reached the specified response time (S130: YES), the control unit 100 determines whether there is fuel leakage (S140). When the fuel leakage does not occur (S140: YES), the control unit 100 changes the fuel cutoff flag from ON to OFF (S150). As a result, the fuel injection through the fuel injection process (S160, S170) can be executed. That is, when the start switch 70 is turned on (S160: YES), the control unit 100 executes fuel injection (S170). The control unit 100 does not execute the fuel injection through the fuel injection process if the leakage determination process has not been completed even in a case in which the start switch 70 has already been turned on. If the control unit 100 determines that fuel leakage has occurred (S140: NO), the control unit 100 keeps the fuel cutoff flag on. Therefore, the control unit 100 does not perform fuel injection.

There may be a response delay from when the first to third hydrogen sensors 91 to 93 are turned on until the first to third hydrogen sensors 91 to 93 output detection values corresponding to the hydrogen concentrations around the first to third hydrogen sensors 91 to 93. The response delay takes, for example, several seconds to several tens of seconds. The specified response time corresponds to the response delay.

Operation of the Present Embodiment

Figure 3:
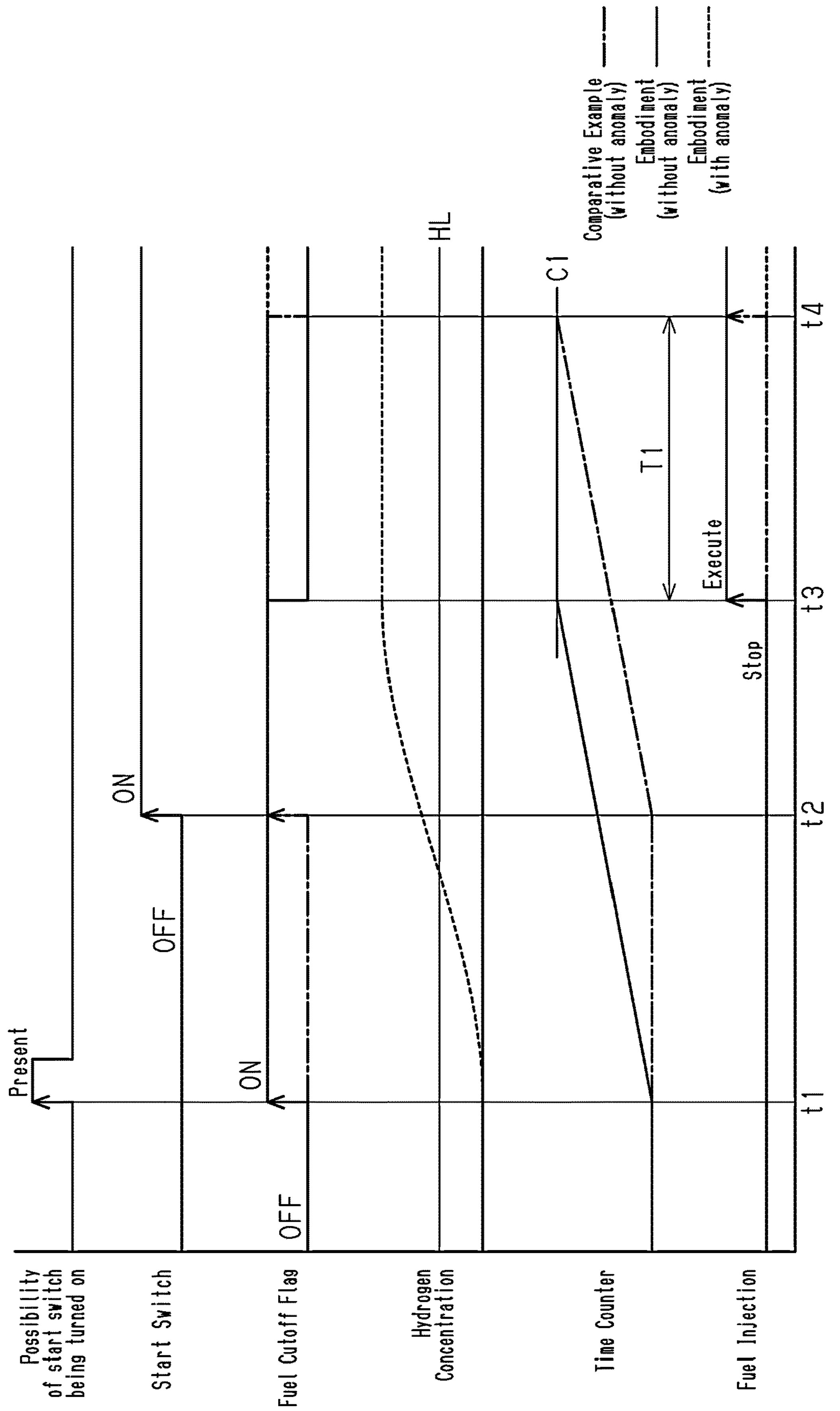
FIG. 3 is a timing diagram showing the relationship between a point in time at which a start switch is turned on and a point in time at which a leakage determination process is started.

The solid lines in FIG. 3 indicate a state in which there is no anomaly, that is, no hydrogen leakage in the present embodiment. When the leakage determination process is started at a point in time t1 in FIG. 3, a time counter value increases from the point in time t1. As a prerequisite for initiating the leakage determination process, it is estimated that there is a possibility of a start operation. The possibility of a start operation is a possibility that the start switch 70 will be turned on. The time counter value increases in accordance with the elapsed time from the start of the leakage determination process. When the time counter value reaches the specified value C1 at a point in time t3, the fuel cutoff flag is switched from on to off in a case in which none of the first to third concentrations H1 to H3 exceeds the specified value HL. The specified value C1 is a determination value for determining whether the elapsed time has reached the specified response time.

When the fuel cutoff flag is switched off, fuel injection can be executed if the start switch 70 is on. A broken line in FIG. 3 indicates a state in which an anomaly is present, that is, hydrogen leakage is present in the present embodiment. As indicated by a broken line, at the point in time t3, when any one of the first to third concentrations H1 to H3 exceeds the specified value HL, the fuel cutoff flag is kept on. Therefore, the fuel injection is not performed.

In the comparative example, the leakage determination process is started at a point in time t2 in FIG. 3. At the point in time t2, the start switch 70 has been turned on. The comparative example is indicated by a chain line in FIG. 3. The alternate long and short dash line indicates a state without anomaly in the comparative example. In the comparative example, as indicated by the one dot chain line, the time counter value reaches the specified value C1 at a point in time t4. Therefore, in the comparative example, even if the start switch 70 has been turned on at the point in time t1, the fuel injection cannot be executed until the point in time t4. A time period T1 shown in FIG. 3 is a time period between the point in time t3 and the point in time t4. That is, in the comparative example, the start of the fuel injection is delayed by the time period T1 compared to the present embodiment. On the other hand, in the present embodiment, the leakage determination process can be started at the point in time t1 when it has been estimated that there is a possibility of a start operation. Therefore, in the present embodiment, the fuel injection can be started at the point in time t3 after the specified response time has elapsed from the point in time t1.

Advantages of the Present Embodiment

The present embodiment provides the following effects.

(1) The control unit 100 of the internal combustion engine 10 shortens the time from when the start switch 70 is turned on at the point in time t2 shown in FIG. 3 to when fuel injection by the fuel injection valves 52 becomes possible by the time period T1 shown in FIG. 3.

(2) The vehicle 200 includes a vehicle on-board device having a device state that switches between two different states during the start preparation period. The vehicle on-board device has a device state that switches between a first state and a second state. The second state is different from the first state. The start preparation period is a period from when the passenger door 61 is opened to when the start switch 70 is turned on. The operation of opening the passenger door 61 may include an operation of unlocking the lock mechanism 62 of the passenger door 61. The start estimation process estimates that there is a possibility of a start operation based on the detection of the switching of the device state of the vehicle on-board device. The possibility of a start operation is a possibility that the start switch 70 will be turned on. When the device state of the vehicle on-board device is switched, the possibility of a start operation subsequent to the switching is relatively high. The possibility of a start operation is a possibility that the start switch 70 will be turned on. Therefore, according to the above configuration, the estimation accuracy of the startup estimation process is high.

(3) Each of the passenger door 61, the lock mechanism 62, the seat 63, and the seat belt of the vehicle 200 is a vehicle on-board device having a device state in which the device state is switched between two different states during the start preparation period. These vehicle on-board devices are examples of vehicle on-board devices essential to the vehicle 200. Therefore, the start estimation process can be executed based on the device state of the vehicle on-board device essential to the vehicle 200.

(4) The internal combustion engine 10 includes a leakage detector that detects the hydrogen concentration. When fuel leaks from the fuel supply system 10*a*, the hydrogen concentration detected by the control unit 100 increases. Therefore, the determination accuracy of the leakage determination process is high.

(5) The leakage detector requires a specified response time to detect the fuel leakage. The leakage detector measures an elapsed time from the start of the leakage determination process. The leakage detector detects the fuel leakage based on the hydrogen concentration when the elapsed time reaches a specified response time. Therefore, the determination accuracy of the leakage determination process is high.

Modifications

The above-described embodiment can be modified and implemented as follows. The above-described embodiment and the following modifications can be implemented in combination with each other as long as there is no technical contradiction.

In the start estimation process, the point in time at which the start switch 70 is turned on may be acquired multiple times. The start estimation process may estimate that there is a possibility of a start operation at a point in time before a time period in which the start switch 70 is turned on with high frequency.

When an electronic key system is mounted on the vehicle 200, the procedure of the start estimation process may be changed as follows. The electronic key system includes a vehicle ECU which is an ECU of the vehicle 200. The vehicle ECU performs wireless communication with an electronic key present in the vicinity of vehicle 200. The vehicle ECU permits the the lock mechanism 62 of the passenger door 61 to be unlocked when the electronic key is authenticated as a regular electronic key. The regular electronic key can unlock the lock mechanism 62 of the passenger door 61. In this case, the start estimation process may estimate that there is a possibility of the start operation when the electronic key system authenticates that the electronic key is legitimate. The possibility of a start operation is a possibility that the start switch 70 will be turned on.

For example, a camera that captures an image of the vehicle interior, an ultrasonic sensor provided in the vehicle interior, or the like can detect that an occupant has entered the vehicle interior. When such detection is performed, the start estimation process may estimate that there is a possibility of a start operation.

In the above-described embodiment and modified examples, multiple detection events on which the start estimation process estimates that there is a possibility of a start operation are exemplified. The control unit 100 may be configured to detect at least one of the detection events. The start estimation process may estimate that there is a possibility of a start operation when any one of the detection events is detected. The start estimation process may estimate that there is a possibility of a start operation when two or more detection events are detected.

The leakage detector for detecting fuel leakage may be a pressure detection device. For example, the control unit 100 closes the fuel injection valves 52 when the leakage determination process is started. The control unit 100 opens the first shut-off valve 21, the second shut-off valve 22, and the pressure reducing valve 30. The control unit 100 detects a change in the fuel pressure P1 of the fuel supply system 10*a* after the leakage determination process is started. The control unit 100 determines that fuel leakage has occurred when a decrease in the fuel pressure P1 of the fuel supply system 10*a* is detected.

For example, the control unit 100 measures an elapsed time from the start of the leakage determination process. The control unit 100 may detect the fuel pressure P1 when the elapsed time reaches the specified response time, or may detect the reduction amount of the fuel pressure P1. The control unit 100 determines that fuel leakage has occurred when the fuel pressure P1 is smaller than a specified pressure value or when the reduction amount of the fuel pressure P1 is larger than a specified reduction amount. When fuel leakage occurs, there may be a response delay in the decrease in the fuel pressure P1 after the start of the leakage determination process. The specified response time is a time corresponding to the response delay.

The control unit 100 may determine that fuel leakage has occurred when the fuel pressure P1 after the start of the leakage determination process has decreased to atmospheric pressures or have decreased to a pressure value that can be regarded as the atmospheric pressure. The control unit 100 may determine that fuel leakage has occurred when the rate of change in the fuel pressure P1 after the start of the leakage determination process is higher than a specified rate of change.

Fuel leakage may be detected based on the detection results of both the pressure detection device and the concentration detector.

The arrangement position and the number of the hydrogen sensors are arbitrary as long as the hydrogen sensors can detect the hydrogen concentration that changes in accordance with the fuel leakage. The arrangement position and the number of the sensors are arbitrary as long as the sensors can detect the pressures in the fuel supply system 10*a* which change in accordance with the fuel leakage.

After the start of the leakage determination process, the control unit 100 may determine that there is hydrogen leakage based on the fact that the output signal of the hydrogen sensor has converged to a value indicating fuel leakage.

The number of controllers that execute multiple processes including the fuel injection process, the leakage determination process, the start estimation process, the hydrogen concentration detection process, and the hydrogen pressure detection process is arbitrary. For example, multiple controllers may execute these processes. For example, some of the processes are executed by one controller. The remaining processing is performed by another controller. For example, multiple controllers cooperatively execute one process.

The fuel is not limited to hydrogen gas. The fuel may be, for example, natural gas, propane gas, gasoline, light oil, or a mixture thereof. The internal combustion engine 10 may be operated by two or more types of fuels.

In this disclosure, the phrase "at least one of" means "one or more" of a desired choice. As an example, the expression "at least one" as used in this description means "only one of the options" or "both of the two options" if the number of options is two. As another example, the phrase "at least one" as used herein means "only one option" or "any combination of two or more options" if the number of options is three or more.

The controller may include, for example, a dedicated hardware circuit such as an ASIC that performs, by hardware, at least some of the processes performed by software in the above-described embodiment. That is, the controller may have any one of the following configurations (a) A configuration including a processor that executes all of the above-described processes according to programs and a program storage device such as a ROM (including a non-transitory computer-readable storage medium) that stores the programs. (b) A configuration including a a processor and a program storage device that execute part of the above-described processes according to the programs and a dedicated hardware circuit that executes the remaining processes. (c) A configuration including a dedicated hardware circuit that executes all of the above processes. Any number of software execution devices, each including a processor and a program storage device, may be provided. Also, any number of dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine being mounted on a vehicle, the controller comprising processing circuitry, wherein the processing circuitry is configured to execute:

a fuel injection process of executing fuel injection by a fuel injection valve of the internal combustion engine on condition that a start switch of the internal combustion engine has been turned on;

a leakage determination process of determining whether there is fuel leakage from a fuel supply system of the internal combustion engine on condition that the start switch has been turned on; and a start estimation process of estimating whether there is a possibility of a start operation before the start switch is turned on, the possibility of a start operation refers to likelihood that the start switch will be turned on, the processing circuitry is configured not to execute the fuel injection through the fuel injection process if the leakage determination process has not been completed in a case in which the start switch has already been turned on, and the processing circuitry is configured to start the leakage determination process when the start estimation process estimates that there is the possibility of a start operation even if the start switch is not turned on.

2. The controller for the internal combustion engine according to claim 1, wherein the vehicle includes:

a passenger door, a start preparation period being a period from an operation of opening the passenger door to when the start switch is turned on; and a vehicle on-board device having a device state that is switched between a first state and a second state during the start preparation period, the second state being different from the first state, and the start estimation process estimates that there is the possibility of a start operation based on detection of switching of the device state.

3. The controller for the internal combustion engine according to claim 1, wherein the start estimation process estimates that there is the possibility of a start operation based on detection of at least one of the following:

the locking mechanism of a passenger door of the vehicle is unlocked;

an operation of opening the passenger door is performed;

a state of seat of the vehicle is changed to a state of supporting an occupant; and a state of a seat belt of the vehicle is changed to a state of restraining the occupant.

4. The controller for the internal combustion engine according to claim 1, wherein the vehicle includes a concentration detector that detects a hydrogen concentration, the fuel injection valve is configured to inject hydrogen gas as fuel, and the leakage determination process determines the fuel leakage from the fuel supply system based on the hydrogen concentration detected by the concentration detector.

5. The controller for the internal combustion engine according to claim 4, wherein the leakage determination process determines whether there is leakage of hydrogen based on the hydrogen concentration detected by the concentration detector when an elapsed time from a start of the leakage determination process reaches a specified response time.

* * * * *